Aug. 21, 1923.
W. H. EMOND
1,465,729
BODY AND SEAT ARRANGEMENT FOR MOTOR VEHICLES
Filed May 11, 1918 2 Sheets-Sheet 1
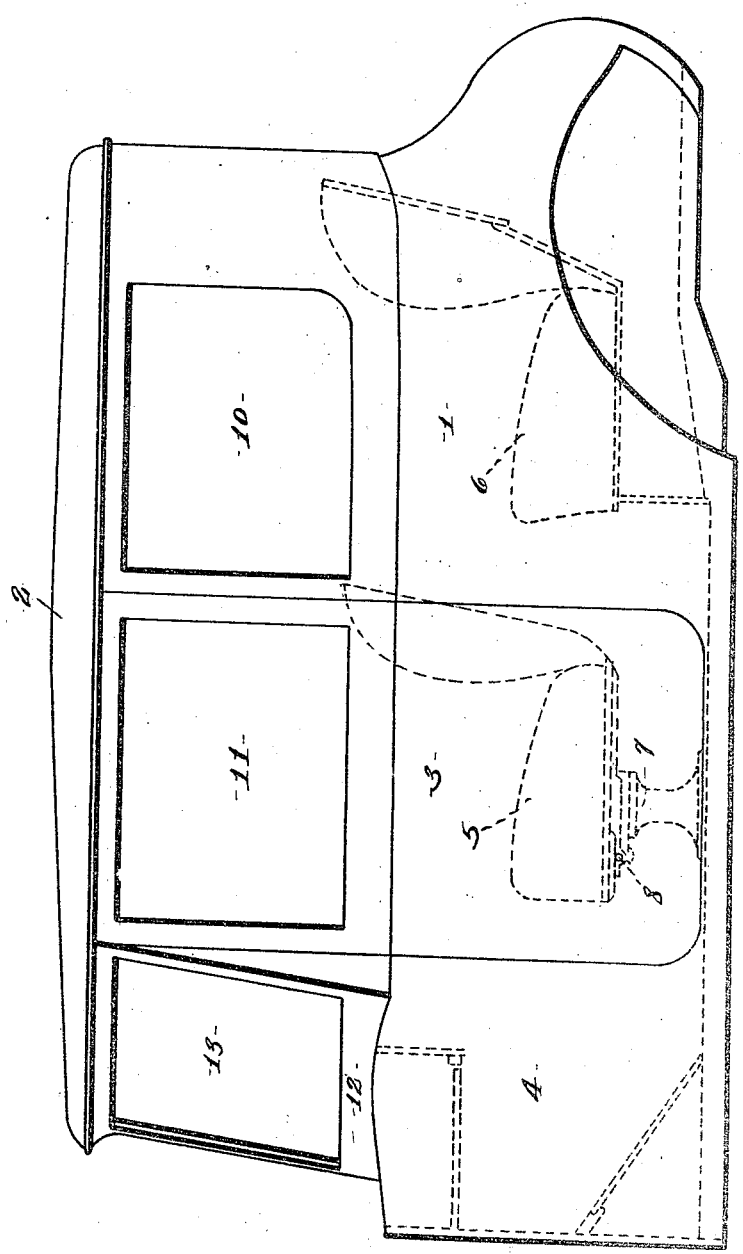
INVENTOR
*William H. Emond.*
BY
*Lawrence & Bodell.*
ATTORNEYS

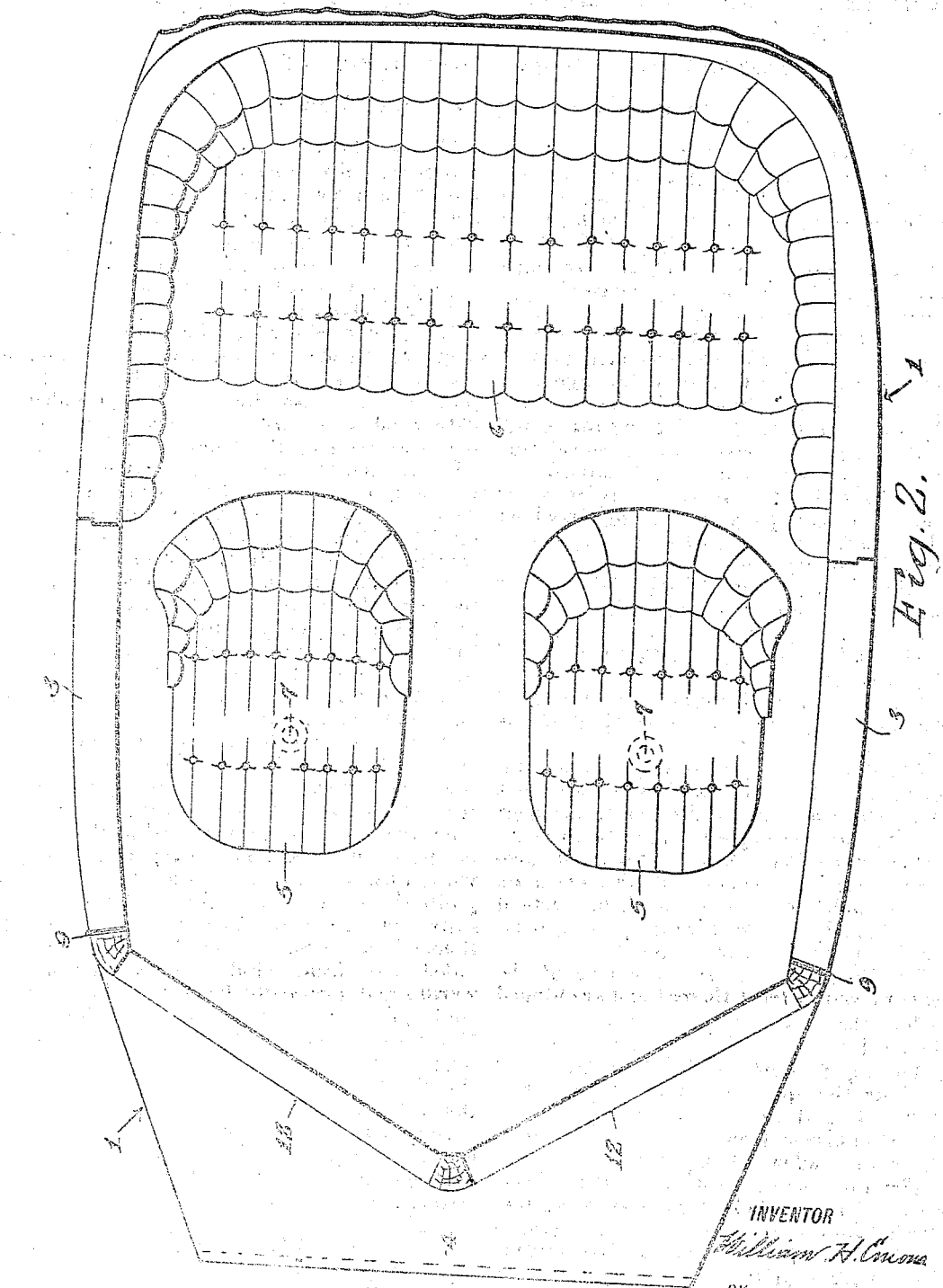

Patented Aug. 21, 1923.

1,465,729

UNITED STATES PATENT OFFICE.

WILLIAM H. EMOND, OF SYRACUSE, NEW YORK, ASSIGNOR TO H. H. FRANKLIN MFG. COMPANY, OF SYRACUSE, NEW YORK, A CORPORATION OF NEW YORK.

BODY AND SEAT ARRANGEMENT FOR MOTOR VEHICLES.

Application filed May 11, 1918. Serial No. 233,838.

*To all whom it may concern:*

Be it known that I, WILLIAM H. EMOND, a citizen of the United States, and a resident of Syracuse, in the county of Onondaga and State of New York, have invented certain new and useful Body and Seat Arrangements for Motor Vehicles, of which the following is a specification.

This invention has for its object a compact but roomy body and seat arrangement for motor cars by which ample passage ways are provided from the single door on each side of the body to the front and rear seats.

The invention consists in the novel features hereinafter set forth and claimed.

In describing this invention, reference is had to the accompanying drawings in which like characters designate corresponding parts in all the views.

Figure 1 is a side elevation of a motor car body embodying my invention.

Figure 2 is a plan view thereof.

The motor car body is here shown as of the brougham type.

1 designates the body having a top 2. 3 are doors in the forward portion of the body. 4 is the cowl.

5 and 6 are respectively the front and rear seats. There are preferably two front seats which are arranged opposite the door openings and are spaced apart to form an aisle between them. The front seats are also spaced from the doors 3. These front seats are revoluble or reversible about vertical axes 7 and tiltable forwardly and rearwardly about horizontal axes 8.

The doors extend from the rear of the seats to well in front thereof and are hinged at 9 at their front edges to the rear end of the cowl 4.

The top 2 is provided with windows 10 opposite the space between the front and rear seats and above the rear seat proper, as distinguished from the back of the seat, and with windows 11 in the door.

The top is also provided with a front wall 12 having windows 13 converging forwardly from near the axes of the doors, to a point located substantially in the central vertical plane of the body.

The windows 13 also incline upwardly and rearwardly from the cowl. Owing to the arrangement of the windows 13 and the doors 3 ample passageways are provided from the door openings to the front seats and to the rear seats. Also ample leg room is provided in front of the front seat.

What I claim is:

1. A motor vehicle body having a top, and doors in the sides of the body, front and rear seats, the front seats being located opposite the doors, and the top being provided with windows in the sides thereof opposite the space between the front and rear seats, and with substantially rectangular windows in the upper portions of the doors, the top being also provided with substantially rectangular front windows converging inwardly and forwardly from near the front edges of the windows of the doors toward the vertical central plane of the body thereby providing passages from the doors to the front seats, substantially as and for the purpose described.

2. A motor vehicle body having a top, and doors in the sides of the body, front and rear seats, the front seats being located opposite to and spaced apart from the doors, the doors extending to the front and the rear of the front seats providing passages from the doors to the front and to the rear of the front seats, and the top being provided with windows in the sides thereof opposite the space between the front and rear seats and with windows in the upper portions of the doors, the body being also provided with front windows converging inwardly and forwardly from near the front edges of the windows of the doors toward the vertical central plane of the body thereby providing a passage from the doors to the front seats, substantially as and for the purpose specified.

In testimony whereof, I have hereunto signed my name at Syracuse, in the county of Onondaga, and State of New York, this 1st day of May, 1918.

WILLIAM H. EMOND.